United States Patent
Gupta et al.

(10) Patent No.: US 7,430,324 B2
(45) Date of Patent: Sep. 30, 2008

(54) METHOD AND APPARATUS FOR CLASSIFYING AND RANKING INTERPRETATIONS FOR MULTIMODAL INPUT FUSION

(75) Inventors: Anurag K. Gupta, Calcutta (IN); Tasos Anastasakos, San Jose, CA (US)

(73) Assignee: Motorola, Inc., Schaumburg, IL (US)

( * ) Notice: Subject to any disclaimer, the term of this patent is extended or adjusted under 35 U.S.C. 154(b) by 827 days.

(21) Appl. No.: 10/853,540

(22) Filed: May 25, 2004

(65) Prior Publication Data

US 2005/0278467 A1 Dec. 15, 2005

(51) Int. Cl.
G06F 3/033 (2006.01)
G06K 9/62 (2006.01)
(52) U.S. Cl. ...................... 382/225; 715/863
(58) Field of Classification Search ......... 382/224–229; 715/863; 704/E17.009
See application file for complete search history.

(56) References Cited

U.S. PATENT DOCUMENTS

| | | | | |
|---|---|---|---|---|
| 5,878,274 | A * | 3/1999 | Kono et al. | 710/8 |
| 6,868,383 | B1 * | 3/2005 | Bangalore et al. | 704/254 |
| 7,069,215 | B1 * | 6/2006 | Bangalore et al. | 704/255 |
| 7,257,575 | B1 * | 8/2007 | Johnston et al. | 707/4 |
| 2003/0046087 | A1 * | 3/2003 | Johnston et al. | 704/275 |
| 2003/0055644 | A1 * | 3/2003 | Johnston et al. | 704/251 |
| 2003/0065505 | A1 * | 4/2003 | Johnston et al. | 704/9 |
| 2003/0093419 | A1 * | 5/2003 | Bangalore et al. | 707/3 |
| 2004/0093215 | A1 * | 5/2004 | Gupta et al. | 704/270 |
| 2005/0238207 | A1 * | 10/2005 | Tavares | 382/115 |
| 2006/0143216 | A1 * | 6/2006 | Gupta et al. | 707/102 |
| 2006/0143576 | A1 * | 6/2006 | Gupta et al. | 715/809 |

FOREIGN PATENT DOCUMENTS

EP 1286251 A2 * 2/2003

OTHER PUBLICATIONS

Johnston, Michael. "Unification-based Multimodal Parsing". Proceedings of Coling-ACL: 1998.*
Johnston, Michael and Srinivas Bangalore. "Finite-state Methods for Multimodal Parsing and Integration". AT&T Labs—Research Laboratory, Florham Park, NJ.*
Johnston, M.; Cohen, P.; McGee, D.; Oviatt, S.; Pittman, J.; Smith, I.; "Unification-Based Multimodal Integration" Center for Human Computer Commurication, Department of Computer Science and Engineering, Oregon Graduate Institute.
Oviatt, S.; Cohen, P.; "Miltimodal Interfaces That Process What Comes Naturally" Communications of the ACM Mar. 2000 vol. 43 No. 3.

* cited by examiner

*Primary Examiner*—Jingge Wu
*Assistant Examiner*—Manav Seth (57) ABSTRACT

A method used in an electronic equipment (100) generates a set of joint multimodal interpretations (125) from a set of multimodal interpretations (115) generated by one or more modalities (105) during a turn, generates a set of integrated multimodal interpretations (135) including an integrated multimodal interpretation formed from each joint multimodal interpretation by unifying the type feature structure of each multimodal interpretation in the joint multimodal interpretation, and generates a multilevel confidence score for each integrated multimodal interpretation based on at least one of a context score, a content score, and a confidence score of the integrated multimodal interpretation. The method classifies the multimodal interpretations and generates a set of joint multimodal interpretations that comprises essentially all possible joint multimodal interpretations. The multilevel confidence scoring is based on up to eleven factors, which provides for an accurate ranking of the integrated multimodal interpretations.

4 Claims, 9 Drawing Sheets

|       | A-SP | A-HW | A-KB | B-SP | B-KB | C-SP | C-HW | D-GS | E-GS | E-KB |
|-------|------|------|------|------|------|------|------|------|------|------|
| A-SP  | X    | SAME | SAME | —    | CTD  | SUB  | SUB  | CTR  | —    | —    |
| A-HW  | SAME | X    | SAME | —    | —    | SUB  | SUB  | CTR  | —    | —    |
| A-KB  | SAME | SAME | X    | —    | —    | SUB  | SUB  | CTR  | —    | —    |
| B-SP  | —    | —    | —    | X    | SAME | —    | —    | —    | SUB  | SUB  |
| B-KB  | CTR  | —    | —    | SAME | X    | —    | —    | —    | SUB  | SUB  |
| C-SP  | SUP  | SUP  | SUP  | —    | —    | X    | SAME | —    | CTR  | CTR  |
| C-HW  | SUP  | SUP  | SUP  | —    | —    | SAME | X    | —    | CTR  | CTR  |
| D-GS  | CTD  | CTD  | CTD  | —    | —    | —    | —    | X    | —    | —    |
| E-GS  | —    | —    | —    | SUP  | SUP  | CTD  | CTD  | —    | X    | SAME |
| E-KB  | —    | —    | —    | SUP  | SUP  | CTD  | CTD  | —    | SAME | X    |

METHOD AND APPARATUS FOR CLASSIFYING AND RANKING INTERPRETATIONS FOR MULTIMODAL INPUT FUSION

FIELD OF THE INVENTION

This invention is in the field of software and more specifically is in the field of software that interprets inputs that have been received nearly simultaneously by a plurality of input modalities.

BACKGROUND

In systems that use multimodal inputs, such as simultaneous speech, writing, and gesturing, for operating software applications, each unimodal input is typically time segmented and recognized by specialized input functions such as speech recognition, word processing, image recognition, and touch detection function, which produce individual multimodal interpretations. The time segments may be called turns. Each multimodal interpretation is characterized by being identified to a modality (i.e, the identity of the input and recognizer), being given a multimodal type and a confidence score, and values for a set of attributes associated with the multimodal type and modality are generated. The set of information that includes the identification of the modality, the multimodal type, the confidence score, and the attribute values is sometimes called a type feature structure. In some instances, the recognition function generates a plurality of multimodal interpretations from one input. For example, a gesture that points to a map may be interpreted as identifying the region of the map, or a hotel that is on the map. In such instances, the recognizer generates a set (in this example, two) of ambiguous multimodal interpretations, each of which typically has a lower confidence score than when one multimodal interpretation is generated. In some instance, the recognition function can generate a plurality of multimodal interpretations from one input that result from sequential actions (e.g., two gestures may be made during one turn). Such multimodal inputs are independent (not ambiguous).

The multimodal interpretations generated during a time segment are then analyzed as a set to determine a most probable meaning of them when interpreted together. One or more joint multimodal interpretations are generated and a unified type feature structure is generated for each joint multimodal interpretation. An application then uses the unified type feature structure as an input for the application.

In some reported implementations, such as that described in "Multimodal Interfaces That Process What Comes Naturally", by Sharon Oviatt and Philip Cohen, Communications of the ACM, March 2000, Vol. 43, No. 3, when an ambiguous set of multimodal interpretations is generated, combinations are formed using different members of the set of ambiguous multimodal interpretations and the confidence scores of each multimodal interpretation are evaluated in a variety of ways to select a top-ranked joint multimodal interpretation to send to "the system's 'application bridge' agent, which confirms the interpretation with the user and sends it to the appropriate backend application." This approach is inappropriate because the selection of the top-ranked joint multimodal interpretation is not sufficiently reliable for using it without user confirmation, and this approach obviously slows down the speed of input.

Another limitation of some reported implementations is that there is no proposed mechanism for handling independent, non-ambiguous multimodal interpretations from one modality in one turn; the duration of turns have to be managed to avoid independent, non-ambiguous multimodal interpretations from one modality in one turn, and when such management fails, unreliable joint multimodal interpretations result.

What is needed is a more comprehensive and reliable approach for handling multimodal inputs so as to generate better information to pass on to applications.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular multimodal fusion method and apparatus in accordance with the present invention, it should be observed that the present invention resides primarily in combinations of method steps and apparatus components related to multimodal fusion technology. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Figure 1:
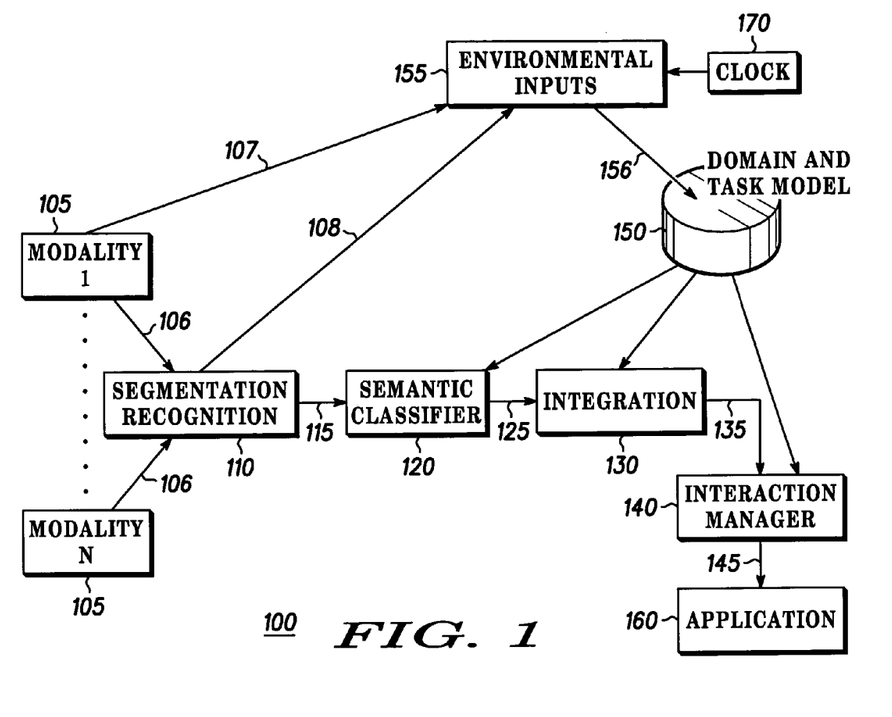
FIG. 1 is a block diagram that shows functions of an electronic equipment for accomplishing multimodal fusion of inputs presented to the electronic equipment, in accordance with some embodiments of the present invention.

Referring to FIG. 1, a block diagram shows functions of electronic equipment 100 that includes apparatus and methods for accomplishing multimodal fusion of inputs presented to the electronic equipment 100, in accordance with some embodiments of the present invention. The electronic equipment 100 comprises input apparatuses 105 of differing types, called modalities, that process input actions that have typically been made by humans. An example of a typical combination of modalities 105 that the electronic equipment 100 might have is a microphone, a touch sensitive display screen, a camera (for capturing gestures), and key switches. The inputs from the modalities 105 are rendered into electronic signals 106 by each modality, which are time segmented and recognized by functions within the segmentation and recognition function 110. The operation of the modalities 105 and the segmentation and recognition functions 110 are well understood by those of ordinary skill in the art, and for the example mentioned would typically include a voice recognition function for the microphone modality, a handwriting interpreter for the touch screen modality, a gesture interpreter for the camera modality, and a command recognizer for the key switches. The segmentation and recognition function 110 generates a set of multimodal interpretations 115 for each time segment, called a turn, of a sequence of time segments. The time segment for a turn may overlap the time segment for a subsequent or previous turn. Each multimodal interpretation (MMI) in the set of multimodal interpretations 115 is typically a unimodal interpretation; that is, each is an interpretation from one modality, but the MMI are so called herein because they may be generated by any of a plurality of modalities. Each MMI is typically rendered as one type of a set of possible types. Many types can be classified as tasks. Thus, a speech input of "create a route from here to there" might be interpreted as being a part of a "create route" task or an "identify a hotel" (that is visible on a map) task. Each MMI type is typically associated with a defined set of attributes. An MMI of one type may be generated by more than one modality. The segmentation and recognition function 110 typically generates each MMI with an associated confidence score that indicates a confidence that the MMI type has been accurately determined, and may also generate the value of one or more attributes of the MMI. The MMI type, the modality that generated the MMI (the MMI modality), identification of the turn in which the MMI was generated, and the defined set of attributes, including any known values, are stored and represented as set of information called a type feature structure (TFS). It is not infrequent that the segmentation and recognition function 110 will render several multimodal interpretations from one modality in a turn. Some of these may be alternative interpretations derived from segments of the electronic signal that have been received from one modality in a turn, for which the segments of the electronic signal from which the alternative MMIs are derived are substantially overlapping. In this situation, these alternative interpretations are described as a subset of ambiguous MMIs. There may be multiple subsets of such ambiguous MMIs, typically generated by more than one modality. The MMI types of MMIs in a subset of ambiguous MMIs may differ from each other.

MMIs resulting from segments of the electronic signal that have been received from a modality in a turn, for which the segments of the electronic signals from which the MMIs are derived are substantially non-overlapping, and which are therefore essentially independent MMIs, are called non-ambiguous interpretations. It will be appreciated that the confidence scores of ambiguous interpretations are typically lower than the confidence scores of non-ambiguous interpretations, but this is not always so. In summary each MMI is identified by an MMI type, a confidence score, a turn, and may have attribute values associated with it. For the rest of this document, the analysis and manipulation of MMIs from only one turn will be discussed, so that it when it is stated that the MMIs can be identified by their MMI type and MMI modality, it is implied that they are generated in one turn.

The set of multimodal interpretations 115 generated in a turn is coupled to and analyzed by a semantic classifier 120, and a set of joint multimodal interpretations (joint MMIs) 125 is generated that is uniquely more comprehensive in many instances than the sets of joint MMIs generated by prior art multimodal fusion techniques, in that more combinations may result. The semantic classifier 120 uses a set of interpretation type relationships that are stored in a domain and task model 150. Details of this aspect are described more fully below. The TFSs of the joint MMIs 125 generated by the semantic classifier 120 are then coupled to and unified by integration function 130, using techniques similar to those used in prior art systems, resulting in a set of integrated MMIs 135 that are coupled to an interaction manager 140. The interaction manager 140 generates a set of ranked MMIs 145 in a unique manner more fully described below that are coupled to one or more applications 160. A multi-level confidence score is determined for each MMI in the set of ranked MMIs by the interaction manager using a much more comprehensive analysis than used in prior art MMI fusion techniques. The MMIs in the set of ranked MMIs 145 are preferably transferred to an application 160 in order of descending multi-level confidence scores (i.e., higher to lower overall confidence scores). Applications that are capable of doing so can use the ranked MMIs and their associated multi-level confidence scores to make a better decision as to which MMI or MMIs to use during a turn than in prior art techniques. Less capable applications can simply use the first MMI, which will be more reliably determined in many instances than in prior art techniques.

The domain and task model 150, in addition to storing the set of interpretation type relationships, stores the TFS definitions for the various MMI types and the various integrated MMI types, and stores environmental information used by the interaction manager 140, although it will be appreciated that such storage could be distributed to any extent, such as splitting it into one or more of the functions 110, 120, 130, 140. Environmental information 156 is passed to the domain and task model 150 from an environmental inputs function 155, that may be coupled directly to environmental inputs such as a clock 170 (to capture a time of day) or coupled 107 to a modality 105 used for generating MMIs (for example, a microphone to capture a background noise level). Alternatively or in addition, the environmental inputs function 155 may be coupled 108 to a segmentation and recognition function 110 such as a sound analyzer portion of a speech analyzer. to accept a recognized environmental parameter, such as the background noise level.

Fusion of MMIs refers to the processes described above, from the point where MMIs are transferred to the semantic classifier 120 to the point where the ranked MMIs are transferred to an application 160.

Figure 2:
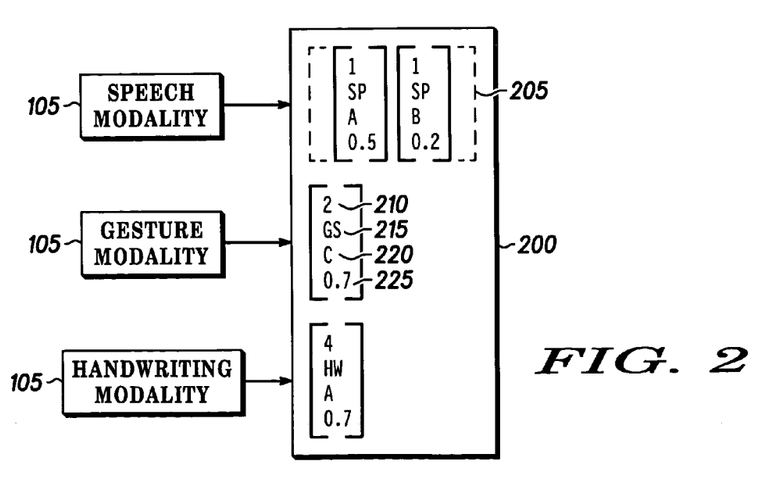
FIGS. 2-3 are representations of data structures that are used during the fusion of multimodal interpretations, in accordance with some embodiments of the present invention.
Figure 3:
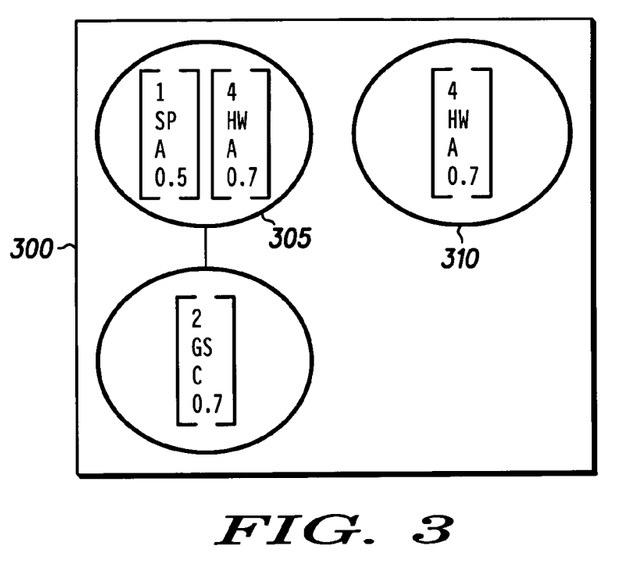

Referring to Tables 1-3 and FIGS. 2-3, representations of data structures that are used during the fusion of MMIs are shown, in accordance with some embodiments of the present invention. Table 1 shows the TFSs for a set of four MMIs generated by the segmentation and recognition function 110 for speech, gesture and handwriting modalities 105.

TABLE 1

```
⎡ Modality: Speech
⎢ startTime: 15:10:24.01, 15 May 2002
⎢ endTime: 15:10:25.77, 15 May 2002
⎢                        ⎛ ⎡ type: CreateRoute                         ⎤   ⎡ type: GetInfoHotel                                          ⎤ ⎞ ⎤
⎢                        ⎜ ⎢ Confidence: 0.7                           ⎥   ⎢ Confidence: 0.2                                             ⎥ ⎟ ⎥
⎢   content: ambiguous   ⎜ ⎢ Reference_Oder: $ref 1, $ref 2            ⎥ , ⎢ Reference_Order: $ref 1, $ref 2                             ⎥ ⎟ ⎥
⎢                        ⎜ ⎢ Source: $ref 1(deictic, 1)                ⎥   ⎣ Hotel: and ($ref 1(deictic, 1), $ref 2(deictic, 1))         ⎦ ⎟ ⎥
⎢                        ⎜ ⎢ mode:                                     ⎥                                                                  ⎟ ⎥
⎣                        ⎝ ⎣ Destination: $ref 2(deictic, 1)           ⎦                                                                  ⎠ ⎦
```

TABLE 1-continued $$\begin{bmatrix} \text{Modality: Gesture} \\ \text{startTime: 15:20:24.43, 15 May 2002} \\ \text{endTime: 15:10:24.56, 15 May 2002} \\ \text{content:} \begin{bmatrix} \text{type: StreetAddress} \\ \text{Confidence: 0.7} \\ \text{Reference\_Order:} \\ \text{Street: 12 Lord Street} \\ \text{City: Botany} \\ \text{State: NSW} \\ \text{Zip: 2019} \\ \text{Country: Australia} \end{bmatrix} \end{bmatrix} \begin{bmatrix} \text{Modality: Handwriting} \\ \text{startTime: 15:10:26.32, 15 May 2002} \\ \text{endTime: 15:10:27.11, 15 May 2002} \\ \text{content:} \begin{bmatrix} \text{type: CreateRoute} \\ \text{Confidence: 0.7} \\ \text{Reference\_Order:} \\ \text{Source:} \\ \text{mode: quickest} \\ \text{Destination:} \end{bmatrix} \end{bmatrix}$$

In this example, a user of a multimodal map-based navigation application says, "Create a route from here to there", makes a pointing gesture to select a location shown on a map that is displayed on a touch sensitive screen, and writes "quickest" on the screen. The spoken input is ambiguously interpreted by the segmentation and recognition function 110 as one of two tasks (i.e., two MMI types)—CreateRoute and GetInfoHotel. The subset of TFSs for the two ambiguous speech MMIs are identified as such by "content: ambiguous" and identified by a set of braces. It can be observed that the modality, turn, and confidence score are included in the TFS for each MMI, as well as lists of attributes. The turn in this example is identified by exact start and stop times, which may be observed to be different but within four seconds of each other. This is a very typical time spread and overlapping of times within a turn. It will be observed that some attributes have explicit references that are not identified at this point in the analysis of the MMIs—for example, "Source:$ref1 (deictic, 1)" in the TFS for the Create Route type of MMI from the Speech Modality. Some attributes have no values at this point in the analysis of the MMIs, such as "mode:" in the TFS for the Create Route type of MMI from the Speech Modality. Some other attributes have values, for example, "mode:" in the TFS for the Create Route type of MMI from the Gesture Modality has a value of "quickest".

For purposes of generating joint MMIs by the semantic classifier function 120, the set of four MMIs represented by the TFSs in Table 1 may be represented more succinctly as shown in FIG. 2, in which the MMIs 200 are illustrated as being derived from the modalities 105, and wherein each MMI is assigned four identifying values. Two of the MMIs 205 are ambiguous MMIs, as noted above in Table 1. For simplicity of programming in ensuing stages of the analysis, identification numbers 210 are assigned to each non-ambiguous MMI and an identification number 210 is assigned to each MMI in each subset of ambiguous MMIs, of which there is only one subset 205 in this example. The MMI modality is identified in this and other examples herein by a two letter code 215. The MMI type is identified by a one letter code 220, and the confidence score is provided as a value 225. Letter code A indicates Create Route; Letter code B indicates GetInfoHotel; and Letter code C indicates StreetAddress. It will be appreciated that many other methods could be used to uniquely identify the MMI type, MMI modality, and confidence scores of the MMIs, as well as the subsets of ambiguous MMIs within a turn.

The semantic classifier 120 generates a set of joint MMIs 300 from the set of MMIs 200. These joint MMIs 300 are illustrated in FIG. 3 by sets of the MMIs that have been formed using a set of interpretation type relationships stored in the domain and task model 150. In FIG. 3, two joint interpretations 305, 310 have been formed. The relationships of MMIs within the joint MMI 305 are signified by the line between the circles and by the inclusion of two MMIs of the same MMI type within one circle. The joint MMI 310 is named a joint MMI even though it includes only one MMI, because it has been formed by the same process used by the semantic classifier 120 to determine other joint MMIs.

The set of joint MMIs 300 is passed to the integration function 130, resolves the explicit references within the TFSs for each joint MMI. For joint MMI 305, the reference variable $ref1 is satisfied as a contextual reference by getting the current location from a Contextual Reference database in the domain and task model 150, and reference variable $ref2 is satisfied with the TFS of the MMI received from gesture. For joint MMI 310, the reference variables are not resolved because there are no possible referents in the TFSs for joint MMI 310 and the Contextual Reference database does not provide appropriate contextual referents. The two reference variables in the TFS for MMI 310 are replaced with the 'unresolved' operator. After reference resolution, the TFSs are unified. For joint MMI 305, the two TFSs of the same MMI type (A) are unified using a fusion algorithm, generating a first integrated MMI, for which the unified TFS is shown in Table 2.

TABLE 2

$$\begin{bmatrix} \text{Modality: Speech, Gesture, Handwriting} \\ \text{startTime: 15:10:24.01, 15 May 2002} \\ \text{endTime: 15:10:27.11, 15 May 2002} \\ \text{content:} \begin{bmatrix} \text{type:CreatRoute} \\ \text{Confidence: 0.7} \\ \text{Reference\_Order:} \\ \text{Source:} \begin{bmatrix} \text{type: StreetAddress} \\ \text{Street: 1Main St} \\ \text{City: Bondi} \\ \text{Zip: 2034} \end{bmatrix} \\ \text{mode:} \\ \text{Destination:} \begin{bmatrix} \text{type: StreetAddress} \\ \text{Street: 12 Lord Street} \\ \text{City: Botany} \\ \text{State: NSW} \\ \text{Zip: 2019} \\ \text{Country: Australia} \end{bmatrix} \end{bmatrix} \end{bmatrix}$$

For joint MMI 310, there is only one MMI. Hence, no unification is performed and the integrated MMI is the MMI itself, for which the unified TFS is shown in Table 3.

TABLE 3

$$\begin{bmatrix} \text{Modality: Speech} \\ \text{startTime: 15:10:24.01, 15 May 2002} \\ \text{endTime: 15:10:25.77, 15 May 2002} \\ \text{content:} \begin{bmatrix} \text{type:GetInfoHotel} \\ \text{Confidence: 0.2} \\ \text{Reference\_Order:} \\ \text{Hotel: and (unreslved (\$ref 1), unresolved (\$ref 2))} \end{bmatrix} \end{bmatrix}$$

The integrated MMIs having TFSs shown in Tables 2 and 3 are ranked by the interaction manager 140 and transferred to the application 160.

Figure 4:
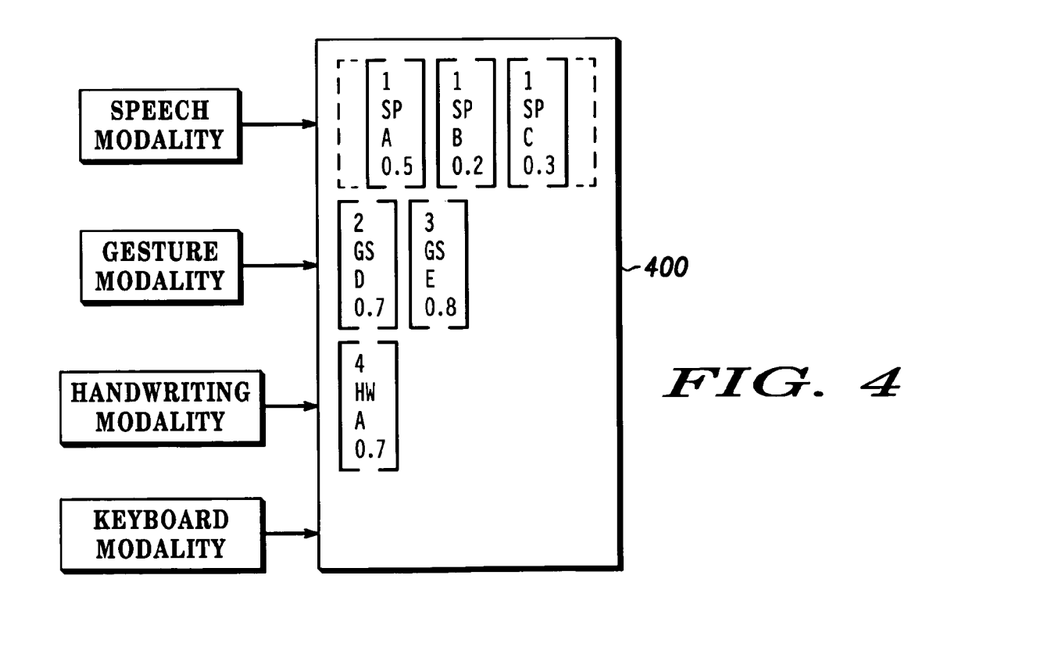
FIGS. 4-9 show data structures and flow charts of a method used by a semantic classifier of the electronic equipment for generating joint multimodal interpretations, in accordance with an example of some embodiments of the present invention.
Figure 5:
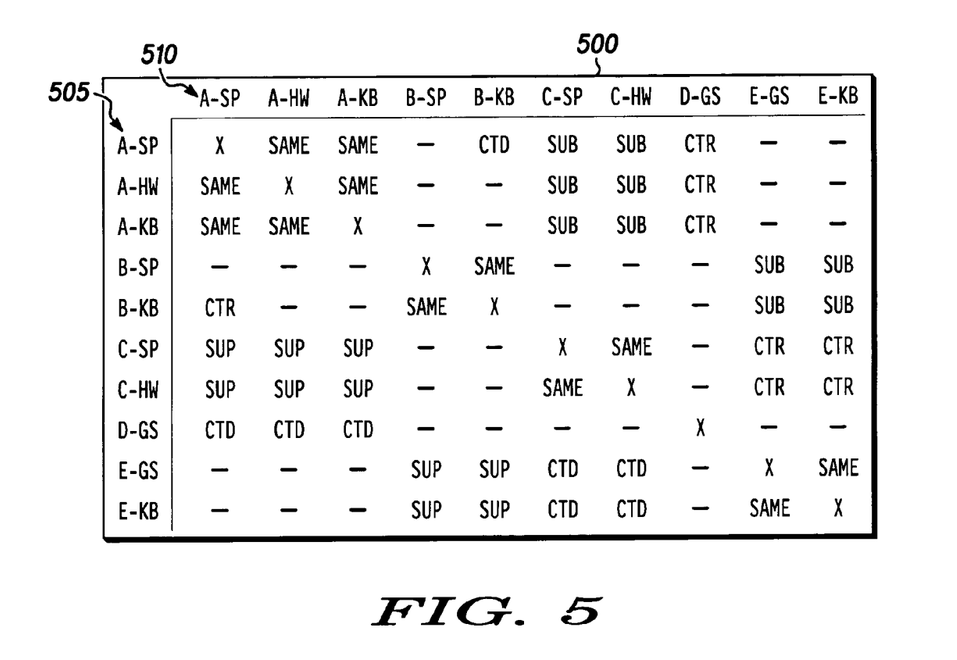

Referring to FIGS. 4-9, a method used by the semantic classifier 120 for generating joint MMIs from a set of MMIs generated in a turn is now described in more detail, in accordance with an example of some embodiments of the present invention. A set of MMIs 400 for this example includes six MMIs, three of which are in an ambiguous set of MMIs having an ID of 1, as shown in FIG. 4. A set of interpretation type relationships 500 is stored in the domain and task model 150, which is shown in FIG. 5 as a two dimensional matrix. This is a set of direct relationships between MMIs identified by the MMI type and the MMI modality. The first column 505 of the matrix is a set of identifiers that identify an MMI type as a letter followed (after a dash) by a two letter code that identifies the MMI modality. The first row 510 of the matrix consists of the same set of identifiers. An interpretation type relationship between a first MMI type and modality combination and a second MMI type and modality combination is specified at an intersection of a row that is identified by the first MMI type and modality combination and column that is identified by the second MMI type and modality combination, except for intersections of the exact same MMI type and modality, in which an X is entered. The following relationships exist in some embodiments of the present invention: a SAME relationship (i.e., both types are the same, although from differing modalities) listed as "SAME", a CONTAINED relationship listed as "CTD", a CONTAINER relationship' listed as "CTR", a SUPER relationship' listed as "SUP", and a SUBORDINATE relationship' listed as "SUB". Where no relationship exists, a "—" is shown. The CONTAINED and CONTAINER relationships, as evidenced in this exemplary set, are reciprocal, as are the SUPER and SUBORDINATE relationships. It will be appreciated that because of the reciprocity of relationships, the matrix could be reduced to a triangular form, and it will be further appreciated that there are a variety of other ways to store the information in a computer memory.

Figure 6:
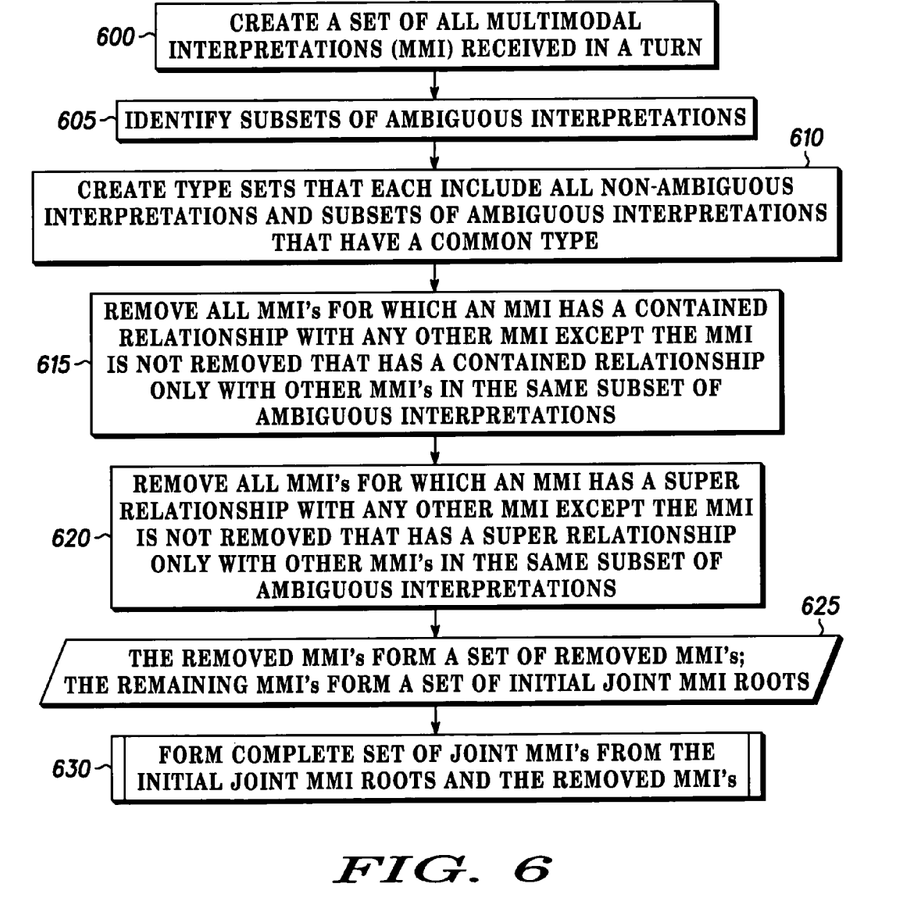

Referring to FIG. 6, a flow chart shows some steps of a method for fusion of multimodal interpretations. At step 600 a set of MMIs 115 generated within a turn and are received at the semantic classifier 120. The set of MMIs 115 have been generated by the set of modalities 105. At step 605, each MMI is identified as one of either a non-ambiguous interpretation or an ambiguous interpretation of a subset of ambiguous interpretations of the set of MMIs. Each MMI is identified with the modality that has generated the multimodal interpretation. Each MMI is assigned an interpretation type and confidence score.

At step 610, the semantic classifier 120 creates a set of initial joint MMI roots from the set of MMIs 115 and identifies type sets within the set of initial joint MMI roots, each type set including all non-ambiguous interpretations and subsets of ambiguous interpretations that have a common type.

At step 615 the semantic classifier 120, referring to the set of interpretation type relationships 500, removes from the set of initial joint MMI roots each MMI for which the MMI has a contained relationship with any other MMI in the set of initial joint MMI roots, except that the MMI is not removed when the MMI has a contained relationship only with one or more MMIs in a subset of ambiguous interpretations that includes the MMI (if such subset exists).

At step 620 the semantic classifier 120, again referring to the set of interpretation type relationships 500, removes from the set of joint initial MMI roots each MMI for which the MMI has a super relationship with any other MMI in the set of initial joint MMIs, except that the MMI is not removed when the MMI has a super relationship only with one or more MMIs in a subset of ambiguous interpretations that includes the MMI (if such subset exists).

The removed MMIs form at step 625 a set of removed MMIs and the remaining MMIs form a set of initial joint MMI roots.

This method is completed when the sematic classifier 120 performs a process at step 630 of forming a complete set of joint MMIs 125 from the set of initial joint MMI roots and the set of removed MMIs, again using the set of interpretation type relationships.

Figure 7:
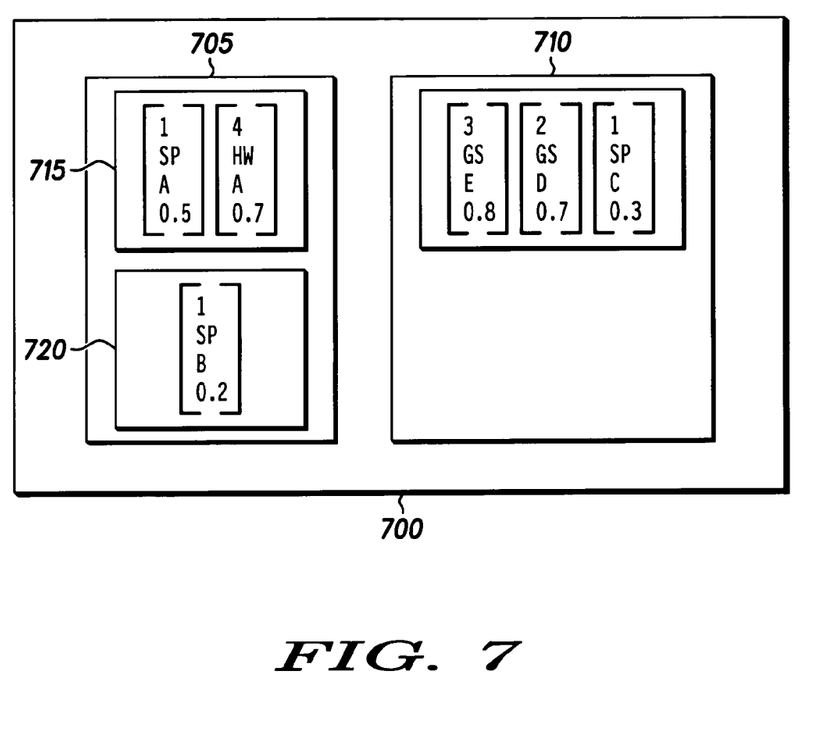

Referring to FIG. 7, the set of MMIs 400 is shown as it has been reorganized into a set 700 comprising a set of initial joint MMI roots 705 and a set of removed MMIs 710, using the exemplary set of interpretation type relationships 500 and the steps 610-625. In the set of removed MMIs 710, MMIs of type D and type E were removed by step 615 because they are contained, respectively, in MMI type A from the speech modality and MMI type C from the speech modality, and MMI type C was removed in step 620 because it has relationship super to MMI type A of modality hardware. MMI type A of the speech modality and MMI type A of the handwriting modality form an initial joint MMI root 715 and MMI type B forms an initial joint MMI root 720.

Figure 8:
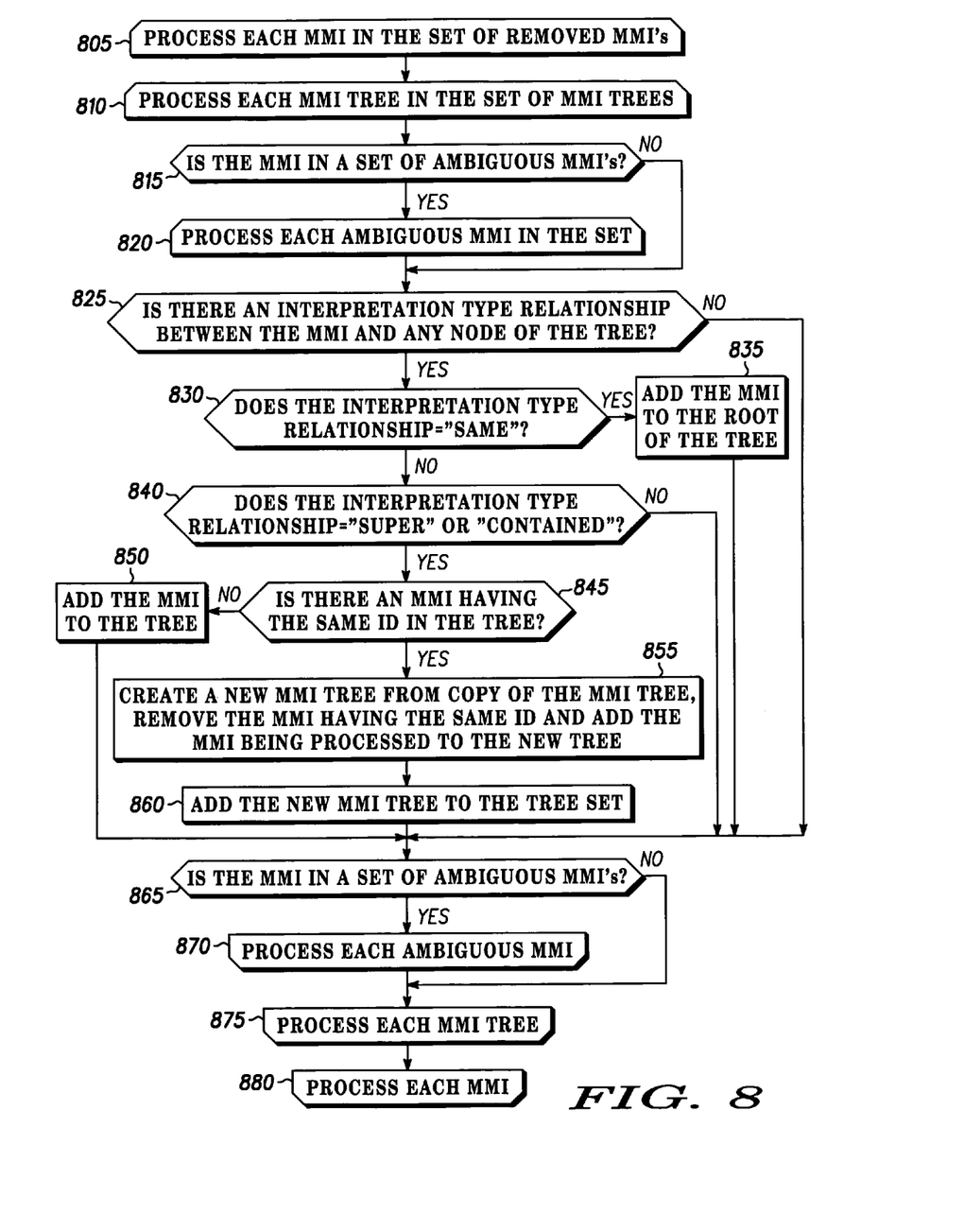

Referring to FIG. 8, some steps of the process 630 of forming a set of joint MMIs 125 from the set of initial joint MMI roots and the set of removed MMIs are shown, in accordance with some embodiments of the present invention. The set of initial joint MMI roots is transformed by the process 630 into a set of joint MMIs by forming sets of MMI trees in which each MMI tree, when completed, represents the relationships of the MMIs within a joint MMI. An initial joint MMI root or the initial MMI root as MMIs are added to it by the process 630 are thus referred to as an MMI tree, and the set of initial joint MMI roots is a set of MMI trees. At step 805 a loop is started in which each MMI in the set of removed MMIs is processed. An inner loop is started at step 810, in which each MMI tree in the set of MMI trees is processed. At step 815, a determination is made as to whether the MMI is in a set of ambiguous MMIs. When the MMI is in a set of ambiguous MMIs, an inner loop is started at step 820 in which each MMI within the ambiguous set is processed. As a next step of the inner loop started at step 820, or when a determination is made at step 815 that the MMI is a non-ambiguous, a determination is then made at step 825 as to whether there exists any interpretation type relationship between the MMI and the root of the MMI tree being processed, using a set of interpretation type relationships such as the one described with reference to FIG. 5. When there is found to be no interpretation type relationship at step 825, then the process continues at step 865 described below. When there is found to be an interpretation type relationship at step 825, then a determination is made as to whether the interpretation type relationship is of the type "SAME" at step 830. When the interpretation type relationship is of the type "SAME", then the MMI is added to the root of the MMI tree at step 835 and the process is continued at step 865 as described below. When the interpretation type relationship is not of the type "SAME", then a determination is made at step 840 as to whether the interpretation type relationship is one of "SUPER" or "CONTAINED", and when it is not the process is continued at step 865, as described below. When the interpretation type relationship is determined to be one of "SUPER" or "CONTAINED" at step 840, a determination is made at step 845 as to whether there already exists an MMI from the same set of ambiguous interpretations in the MMI tree (this can be determined by finding if it has the same ID as the MMI being processed). When there does not already exist an MMI from the same set of ambiguous interpretations in the MMI tree, then the MMI being processed is added to the MMI tree and the process continues at step 865, described below. When an MMI in the MMI tree is found to be in the same set of ambiguous interpretations as the MMI being processed at step 845, a copy of the MMI tree is made and the MMI in the copy of the MMI tree is replaced by the MMI being processed at step 855, and the new MMI tree is added to the set of MMI trees at step 860.

When there is found to be no interpretation type relationship between the MMI and the MMI tree at step 825, or when the interpretation type relationship has been found to be "SAME" and a new MMI tree has been added at step 835, or when the interpretation type is found not to be "SUPER" or "CONTAINED" at step 840, or when the interpretation type has been found to be "SUPER" or "CONTAINED" and the MMI has been added to the MMI tree at step 850, or when the interpretation type has been found to be "SUPER" or "CONTAINED" and the new MMI tree has been added at step 860, a determination is made as to whether the MMI being processed is in a set of ambiguous interpretations at step 865, and when it is, the inner loop for the set of ambiguous interpretations is cycled at step 870 (i.e., a next iteration is performed or the loop is completed). When the MMI being processed is not in a set of ambiguous interpretations at step 865, or when the inner loop for the set of ambiguous interpretations is competed at step 870, then the inner loop for the set of MMI trees is cycled at step 875. When the inner loop for the set of MMI trees is completed at step 875, then the loop for removed MMIs is cycled at step 880. Note that the loop for removed MMIs is cycled so that all removed MMIs are processed until they are added onto at least one tree. Some MMIs may have to be processed through the loop more than once to be added to a tree. When the loop for removed MMIs is completed at step 880 by depletion of all MMIs from the set of removed MMIs, the process 630 to form a set of joint MMIs from the initial joint MMI roots and the removed MMIs is complete.

Figure 9:
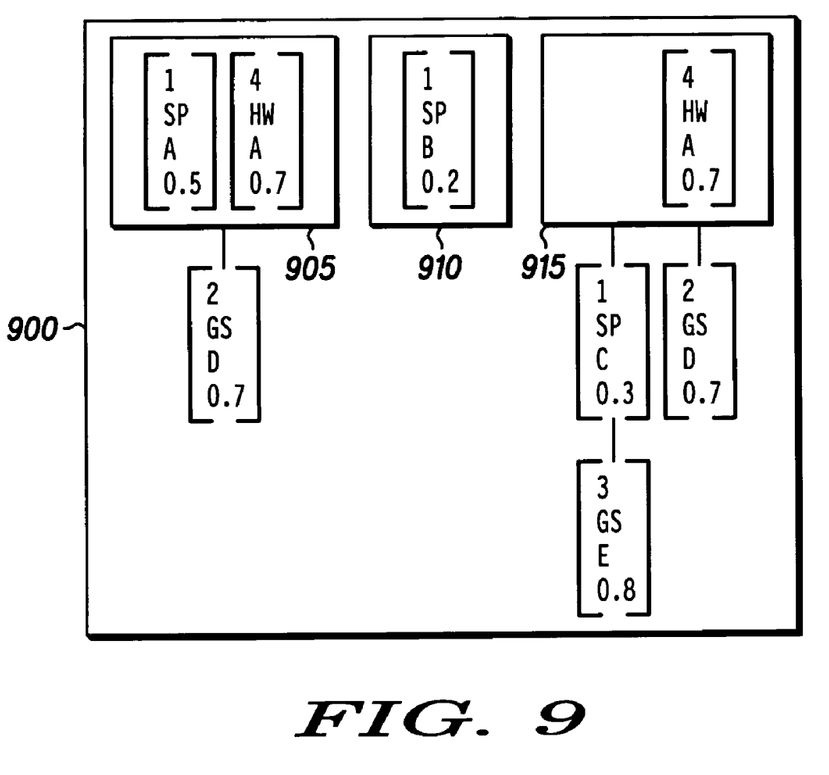

Referring to FIG. 9, a set of joint MMIs 900 is shown that has resulted from the application of the method described with reference to FIG. 8 to the set of initial joint MMI roots 705 and a set of removed MMIs 710. At a first pass of the method, the MMI having type E is not added to any of the initial joint tree roots because there is no relationship type found. At a second pass, the MMI having type D is found to have a CONTAINED type of relationship with relationships type A-SP, A-HW, and A-KB, so it is added to initial tree root 715 of FIG. 7, forming tree 905 of FIG. 9. At a third pass, the MMI having type C is found to have a SUPER relationship with relationship type A-HW, but it has the same ID as MMI having type and modality A-SP of tree 905 (they are in the same set of ambiguous MMIs), so a new tree 915 is generated by copying tree 905 and removing the MMI having type and modality A-SP. The MMI type C is added to tree 915. At a fourth pass, the MMI having type is re-evaluated and is found to have a CONTAINED relationship to MMI type and modality C-SP, so it is added to tree 915. Nothing has been added to initial joint MMI root 720, so it becomes tree 910. The trees 905, 910, 915 form the set of joint MMIs 900.

It can be seen that the processes described with reference to FIGS. 6 and 8 classify the MMIs and may generate a set of joint MMIs that comprises all possible joint MMIs, each of which is formed from one of all possible combinations of MMIs of the set of MMIs such that each joint MMI has no more than one ambiguous interpretation from each subset of ambiguous interpretations, and such that the MMIs of each joint MMI satisfy an interpretation type relationship of a defined set of interpretation type relationships based on the interpretation type and modality of each MMI. The possible combinations of MMIs may include those that have as few as one MMI in them, as illustrated by the example of FIG. 9, and can provide multiple trees on those occasions when one modality generates two independent MMI's (not illustrated in the figures). It will be appreciated that the steps of the methods shown in FIGS. 6 and 8 may not need to be performed in the order shown and that the methods described are but one way to accomplish the unique objective of classifying the MMIs and generating a set of joint MMIs that comprises all possible joint MMIs as defined above.

Figure 10:
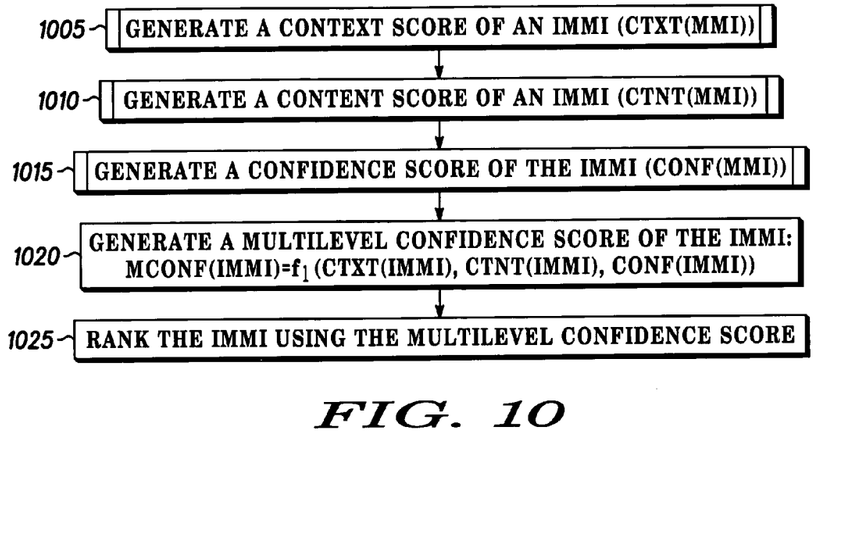
FIGS. 10-13 show flow charts that illustrate a method used by an interaction manager of the electronic equipment to generate a multilevel confidence score for each integrated multimodal interface, in accordance with some embodiments of the present invention.

Referring now to FIG. 10, a flow chart shows a method used by the interaction manager 140 to generate a multilevel confidence score for each integrated MMI of the set of MMIs generated by the integration function 130 (FIG. 1), in accordance with some embodiments of the present invention. Integrated MMI may hereafter be referred to as IMMI. At step 1005, a context score of an IMMI (CTXT(IMMI)) that is to be rated is determined, as will be described in more detail below. At step 1010, a content score of the IMMI (CTNT(IMMI)) is determined, as will be described in more detail below. At step 1015, a confidence score of the IMMI (CONF(IMMI)) is determined, as will be described in more detail below. At step 1020, a multilevel confidence score of the IMMI (MCONF(IMMI)) is determined based on at least one of the context score, the content score, and the confidence score of the integrated MMI. In other terms, MCONF(IMMI)=$f_1$(CTXT(IMMI), CTNT(IMMI), CONF(IMMI)). The factors and formulas on which the multilevel confidence scores are based are designed such that IMMIs having higher multilevel confidence scores correlate to IMMIs that are more likely to represent the attempted message. The multilevel confidence score may by based on a subset of the content, context, and confidence scores for the IMMI, but it will be appreciated that a more reliable score results when more of these factors are properly designed and included. Proper design may include the use of historical data and iterative design techniques known in the art for optimizing such a predictive function. Neural network and related techniques may be also employed. The interaction manager 140 generates the multilevel confidence scores for all the IMMIs in the set of IMMIs generated for a turn, then at step 1025 generates a set of ranked MMIs 145 in order of decreasing multilevel confidence scores.

Figure 11:
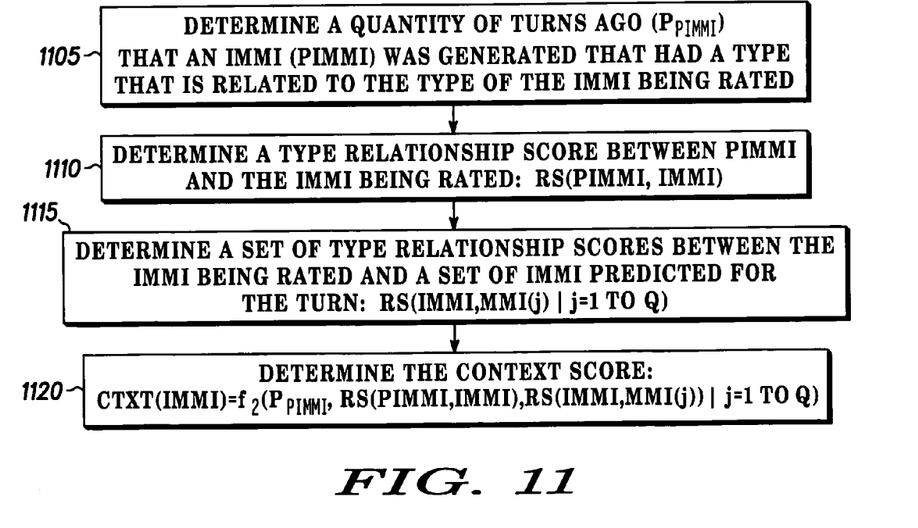

Referring to FIG. 11 a method of generating the context score of the IMMI is shown, in accordance with some embodiments of the present invention. At step 1105, a determination is made of $P_{PIMMI}$, which is a quantity of turns ago that an integrated multimodal interpretation was generated that had a type that is related to the type of the integrated multimodal interpretation.

At step 1110, a determination is made of RS(PIMMI, IMMI), which is a type relationship score determined by a type of relationship between the IMMI and the IMMI generated $P_{PIMMI}$ turns ago.

The type relationship score is a single numerical value that is determined by a larger set of type relationships than those described for the set of interpretation type relationships illustrated in FIG. 8. The type relationship score is a function that is used for this determination and others that follow. The type relationship score includes scores for the DIRECT type relationships, but also includes scores for INDIRECT type relationships. There may be 9 non-zero values (for both DIRECT and INDIRECT versions of SUPER, SUBORDINATE, CONTAINED, and CONTAINER relationships, and for the SAME relationship), and a zero value for no type relationship. The score for SAME is typically greater than the scores for any DIRECT type relationships, and the scores for INDIRECT type relationships are typically lower than the scores for any of the DIRECT type relationships. In the examples used in this document, a type relationship score RS(MMI1, MMI2)=RS(MMI2, MMI1), although the concepts presented herein can be easily extended to a non-reciprocal relationship.

At step 1115, a determination is made of RS(IMMI, MMI(j)|j=1 to Q), which is a set of type relationship scores determined by the types of relationships between the IMMI and each of a set of IMMI that have been predicted to be generated within the turn. The prediction may be made, for example, based on a set of message sequences appropriate for the application type to which the ranked set of IMMIs is being delivered, determined by analysis of the application and/or history of previous (successful) message sequences supplied to the application, and a recent history of IMMIs delivered to the application by the interaction manager 140.

At step 1120, the context score of the IMMI, (CTXT (IMMI)), is determined based on at least one of $P_{PIMMI}$, RS(PIMMI), and RS(IMMI, MMI(j)|j=1 to Q). In other terms, CTXT(IMMI)=$f_2$($P_{PIMMI}$, RS(PIMMI), RS(IMMI, MMI(j)|j=1 to Q)). Preferably, $f_2$ is related in a inverse manner to the value of $P_{PIMMI}$ (i.e, $f_2$ decreases while $P_{PIMMI}$ increases positively as the number of previous turns increases).

Figure 12:
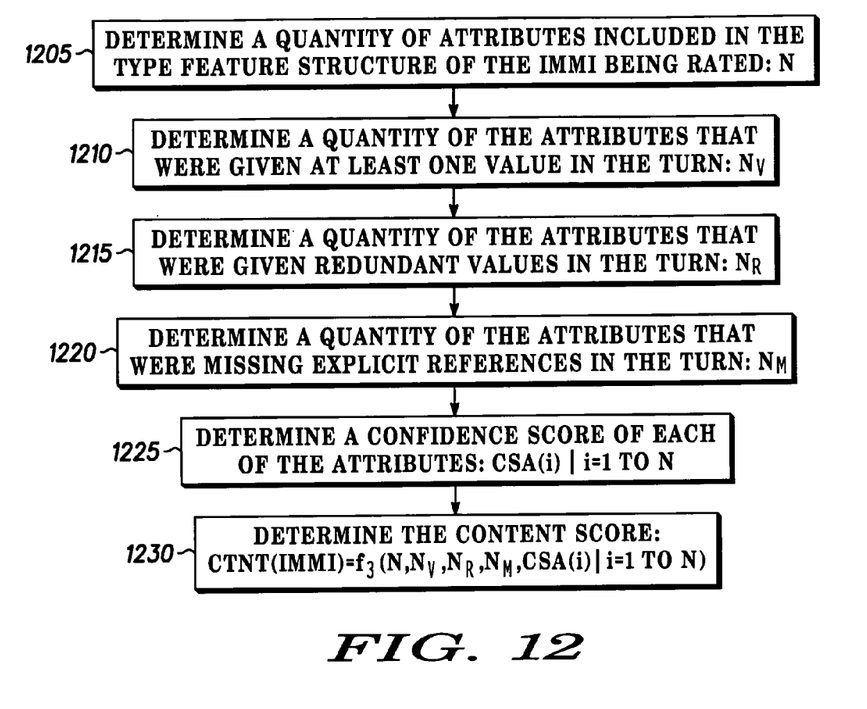

Referring to FIG. 12, a method of determining the content score of the IMMI is shown, in accordance with some embodiments of the present invention. At step 1205, a determination of N is made, which is the quantity of attributes included in the type feature structure of the integrated multimodal interpretation. For example, in the TFS illustrated in Table 2, there are 9 attributes listed (source street, city, and zip; mode; and destination street, city, state, zip, and country).

At step 1210, a determination is made of $N_V$, a quantity of the attributes that were given at least one value in the turn. For the example illustrated in Table 2, $N_V$ is 8.

At step 1215, a determination is made of $N_R$, a quantity of the attributes that were given redundant values in the turn. The term redundant in this context means that when the joint MMI was integrated, two or more TFS's of MMIs that formed the joint MMI had values for one attribute that were identical. (No example is given herein).

At step 1220, a determination is made of $N_M$, which is a quantity of the attributes that were given an explicit reference but not given a value in the turn. An example of this is illustrated in Table 3 wherein the attribute Hotel has two unresolved references, so $N_M$ is 2 for this example.

At step 1225 a determination is made of CSA(i)|i=1 to N, which is a set of confidence scores, one for each attribute that was given a value in the turn. In the example illustrated by Table 2, 8 confidence scores would be determined. These may be generated by the segmentation and recognition function 110 and passed along as part of the TFS, or they may be determined from past statistics.

At step 1230, the content score of the IMMI, (CTNT (IMMI)), is determined based on at least one of N, $N_V$, $N_R$, $N_M$, and CSA(i)|I=1 to N. In other terms, CTNT(IMMI)=$f_3$ (N, $N_V$, $N_R$, $N_M$, CSA(i)|i=1 to N).

Figure 13:
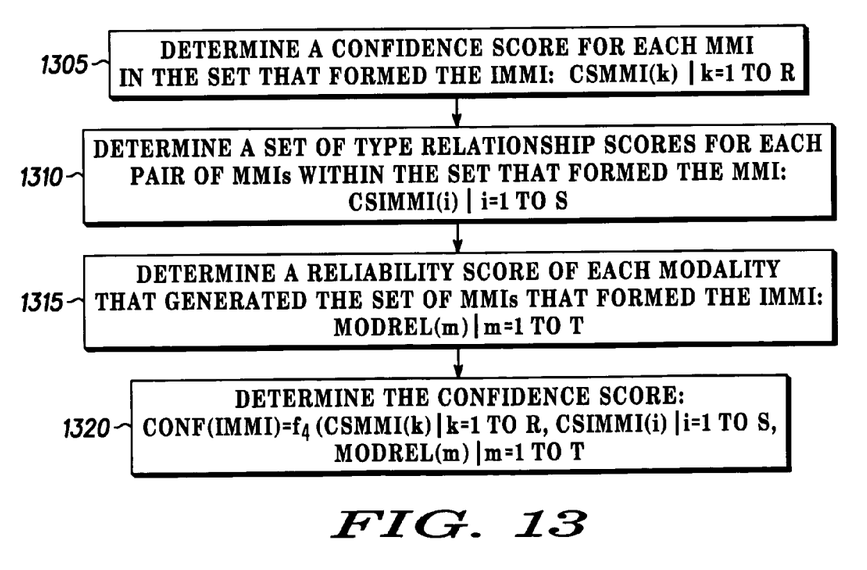

Referring to FIG. 13, a method of generating the confidence score for the IMMI is shown, in accordance with some embodiments of the present invention. At step 1305, a determination is made of CSMMI(k)|k=1 to R, which is a confidence score generated for each MMI that is included in a set of MMIs that formed the IMMI. For the example illustrated in FIG. 5, this would be the confidence scores for the CreateRoute type of the speech modality, the StreetAddress type of the gesture modality, and the CreateRoute type of the handwriting modality.

At step 1310, a determination is made of CSIMMI(m)|m=1 to T, which is a set of type relationship scores determined by the type of relationship between each pair of MMIs within the set of MMIs that formed the IMMI. For the tree 905 illustrated in FIG. 12, this would be the type relationship scores for three pairs of relationships: {(1, SP, A, 0.5),(4, HW, A, 0.7)}, {(2, GS, D, 0.7),(4, HW, A, 0.7)}, and {(2, GS, D, 0.7), (1, SP, A, 0.5)}.

At step 1315, a determination is made of MODREL(m) |m=1 to T, which is a reliability score of each of the one or more modalities that generated the set of MMIs that formed the IMMI. For the tree 905 illustrated in FIG. 12, this would be reliability scores for the SP (speech), HW (handwriting), and GS (gesture) modalities. The reliability score of a modality is based on a history of confidence scores of the modality and a current environment type. Current environment types can include such parameters as background acoustical noise, location, vibration level, lighting conditions, etc.

At step 1320, the confidence score of the IMMI, (CONF (IMMI)), is determined based on at least one of CSMMI(k) |k=1 to R, CSIMMI(i)|i=1 to S and MODREL(m)|m=1 to T. In other terms, CONF(IMMI)=$f_4$(CSMMI(k)|k=1 to R, CSIMMI(i)|i=1 to T, MODREL(m)|m=1 to ).

The multilevel confidence scoring can be seen to be based on up to eleven factors (steps 1105, 1110, 1115, 1205, 1210, 1215, 1220, 1225, 1305, 1310, 1315), which provides for an accurate ranking of the integrated multimodal interpretations. It will be appreciated that prior art systems might incorporate one or two factors similar to those described herein, but the present invention provides a robust and more accurate method of providing a set of ranked IMMIs to an application, thereby increasing the responsiveness of the application to the inputs and reducing the need for manual verification or manual reentry of an input. This can be crucial in some applications, such as vehicular driver advocacy applications.

The factors and formulas on which the context, content, and confidence scores are based are designed such that IMMIs having higher multilevel confidence scores correlate to IMMIs that are more likely to represent the attempted message. The multilevel confidence score may be based on a subset of the content, context, and confidence scores for the IMMI, but it will be appreciated that a more reliable score results when more of these factors are properly designed and included. Proper design may include the use of historical data and iterative design techniques known in the art for optimizing such a predictive function. Neural network and related techniques may be also employed.

The multimodal fusion technology as described herein can be included in complicated systems, for example a vehicular driver advocacy system, or such seemingly simpler consumer products ranging from portable music players to automobiles; or military products such as command stations and communication control systems; and commercial equipment ranging from extremely complicated computers to robots to simple pieces of test equipment, just to name some types and classes of electronic equipment.

It will be appreciated the multimodal fusion technology described herein may be comprised of one or more conventional processors and unique stored program instructions that control the one or more processors to implement some, most, or all of the functions described herein; as such, the functions of determining a set of joint multimodal interpretations and determining a ranked set of integrated multimodal interpretations may be interpreted as being steps of a method. Alternatively, the same functions could be implemented by a state machine that has no stored program instructions, in which each function or some combinations of certain portions of the functions are implemented as custom logic. A combination of the two approaches could be used. Thus, methods and means for performing these functions have been described herein.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

A "set" as used herein, means a non-empty set (i.e., for the sets defined herein, comprising at least one member). The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for generating joint multimodal interpretations, comprising:

receiving a set of multimodal interpretations that are generated within a turn by a set of modalities, wherein each multimodal interpretation is one of either a non-ambiguous interpretation or an ambiguous interpretation of a subset of ambiguous interpretations of the set of multimodal interpretations, and wherein each multimodal interpretation is identified with the modality that has generated the multimodal interpretation, and wherein each multimodal interpretation is assigned an interpretation type and confidence score; and generating a set of joint multimodal interpretations comprising all possible joint multimodal interpretations, each of which is formed from one of all possible combinations of multimodal interpretations of the set of multimodal interpretations such that each joint multimodal interpretation has no more than one ambiguous interpretation from each subset of ambiguous interpretations, and such that the multimodal interpretations of each joint multimodal interpretation satisfy an interpretation type relationship of a defined set of interpretation type relationships based on the interpretation type and modality of each multimodal interpretation.

2. The method according to claim 1, wherein the set of joint multimodal interpretations includes at least one joint multimodal interpretation that includes two multimodal interpretations generated by one source that are not in the same subset of ambiguous interpretations.

3. The method according to claim 1, wherein all possible combinations of multimodal interpretations of the set of multimodal interpretations include all possible combinations having multimodal interpretations from fewer than all of the one or more modalities.

4. The method according to claim 1, wherein each multimodal interpretation is related to at least one other multimodal interpretation in the set of interpretation type relationships by a relationship that is one of direct super, direct sub, direct container, direct contained, and same.

* * * * *